United States Patent
Huang et al.

(10) Patent No.: US 7,377,678 B2
(45) Date of Patent: May 27, 2008

(54) BACKLIGHT MODULE

(75) Inventors: Jyh-Haur Huang, Pingtung County (TW); Chih-Kuang Chen, Kaohsiung (TW); Ko-Chia Kao, Pingtung County (TW)

(73) Assignee: AU Optronics Corp., Hsin-Chu (TW)

( * ) Notice: Subject to any disclaimer, the term of this patent is extended or adjusted under 35 U.S.C. 154(b) by 224 days.

(21) Appl. No.: 11/138,405

(22) Filed: May 27, 2005

(65) Prior Publication Data

US 2006/0181898 A1 Aug. 17, 2006

(30) Foreign Application Priority Data

Feb. 16, 2005 (TW) .............................. 94104554 A

(51) Int. Cl.
*F21V 7/04* (2006.01)
(52) U.S. Cl. ...................... 362/608; 362/609; 362/626; 362/625
(58) Field of Classification Search ................ 362/608, 362/609, 621, 622, 600, 632, 634, 23, 26, 362/623, 625, 626, 298, 346
See application file for complete search history.

(56) References Cited

U.S. PATENT DOCUMENTS

| | | | |
|---|---|---|---|
| 5,709,447 A * | 1/1998 | Murakami et al. | 362/621 |
| 5,926,033 A * | 7/1999 | Saigo et al. | 362/600 |
| 5,926,601 A * | 7/1999 | Tai et al. | 385/146 |
| 6,257,737 B1 | 7/2001 | Marshall et al. | |
| 6,347,873 B1 * | 2/2002 | Hosseini et al. | 362/624 |
| 6,609,808 B2 * | 8/2003 | Chen | 362/632 |
| 6,975,370 B2 * | 12/2005 | Yu et al. | 349/65 |
| 7,101,070 B2 * | 9/2006 | Yu et al. | 362/558 |
| 2002/0135997 A1 | 9/2002 | Lammers | |
| 2004/0095740 A1 * | 5/2004 | Mai et al. | 362/27 |

FOREIGN PATENT DOCUMENTS

| | | |
|---|---|---|
| CN | 1296604 | 5/2001 |
| CN | 1467551 | 1/2004 |
| CN | 1549027 | 11/2004 |

OTHER PUBLICATIONS

Seiji Sakai et. al.; *41.1: A Thin LED Backlight System with High Efficiency for Backlighting 22-in. TFT-LCDs*; 2004; SID 04 Digest; pp. 1218-1221.

* cited by examiner

*Primary Examiner*—Thomas M. Sember
(74) *Attorney, Agent, or Firm*—Bacon & Thomas, PLLC

(57) ABSTRACT

A backlight module including a diffuser, a reflector, a side light source, a prism lens and a TIR (total internal reflection) lens is disclosed. The reflector is disposed under the diffuser. The side light source is disposed on a side between the diffuser and the reflector. The prism lens is disposed between the side light source and the reflector. The TIR lens is disposed on a bottom of the diffuser and adjacent to the side light source.

10 Claims, 3 Drawing Sheets

BACKLIGHT MODULE

This application claims the benefit of Taiwan application Serial No. 094104554, filed Feb. 16, 2005, the subject matter of which is incorporated herein by reference.

BACKGROUND OF THE INVENTION

1. Field of the Invention

The invention relates in general to a backlight module of the liquid crystal display, and more particularly to a backlight module of the liquid crystal display mixing and guiding light without a light guide.

2. Description of the Related Art

Liquid crystal displays have become the mainstream products of the market recently because of the properties of small size, light weight, low electromagnetic radiation and low electricity consumption.

Backlight module provides light for the liquid crystal display. Light from the backlight module passes through a diffuser, a lower substrate, liquid crystal molecules and an upper substrate and displays on the display panel of the liquid crystal display. In the conventional side light type backlight module, the light source is disposed on two sides of the backlight module. The light source is, for example, a light emitting diode. After mixed and guided by the light guide, the light emits from the front side of the light guide. Conventionally, light was mixed by the white reflection print under the light guide so that uniform light can be emitted from the front side of the light guide.

However, when the large-size display becomes more and more popular, the light guide is not suitable to apply onto the large-size liquid crystal display due to its heavy weight. Moreover, both the light guide and the white reflection print absorb light, and therefore the luminance efficiency of the backlight module is decreased, and the product quality of the liquid crystal display is lowered.

SUMMARY OF THE INVENTION

It is therefore an object of the invention to provide a backlight module, directly mixing and guiding light without a light guide and having the properties of light weight and high luminance efficiency.

The invention achieves the above-identified objects by providing a backlight module including a diffuser, a reflector, a side light source and a prism lens. The reflector is disposed under the diffuser. The side light source is disposed on a side between the diffuser and the reflector. The prism lens is disposed between the side light source and the reflector.

The invention achieves the above-identified objects by providing another backlight module including a diffuser, a reflector, a side light source and a total internal reflection (TIR) lens. The reflector is disposed under the diffuser. The side light source is disposed on a side between the diffuser and the reflector. The TIR lens is disposed on a bottom of the diffuser and adjacent to the side light source.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
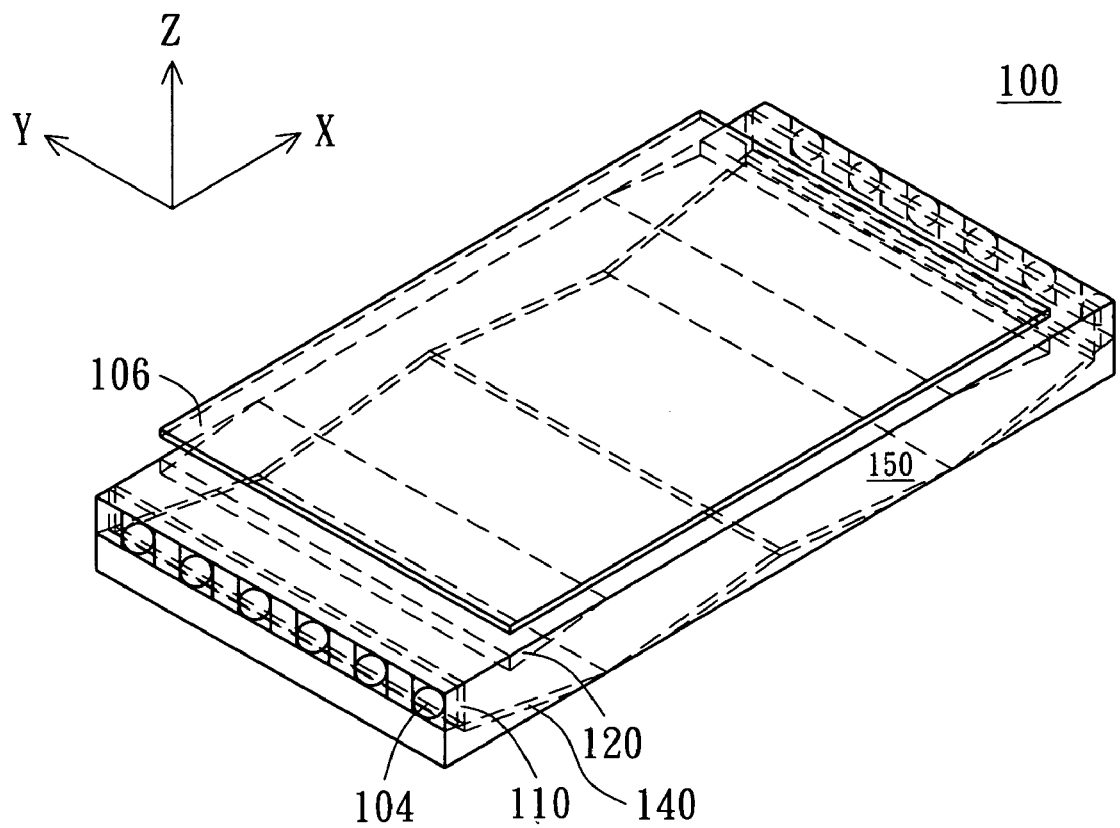
FIG. 1 is a three-dimensional view showing a backlight module according to the preferred embodiment of the invention.

Please referring to FIG. 1, a three dimensional view showing a backlight module according to the preferred embodiment of the invention is illustrated. A backlight module 100 includes a diffuser 106, a reflector 140, a side light source 104, a prism lens 110 and a total internal reflection (TIR) lens 120. The backlight module 100 preferably includes a bezel 150. The bezel 150 has a bottom plane 150b and a side plane 150c. The side light source 104 includes several light emitting diodes arranged on two sides of the bezel 150, for providing light.

Figure 2A:
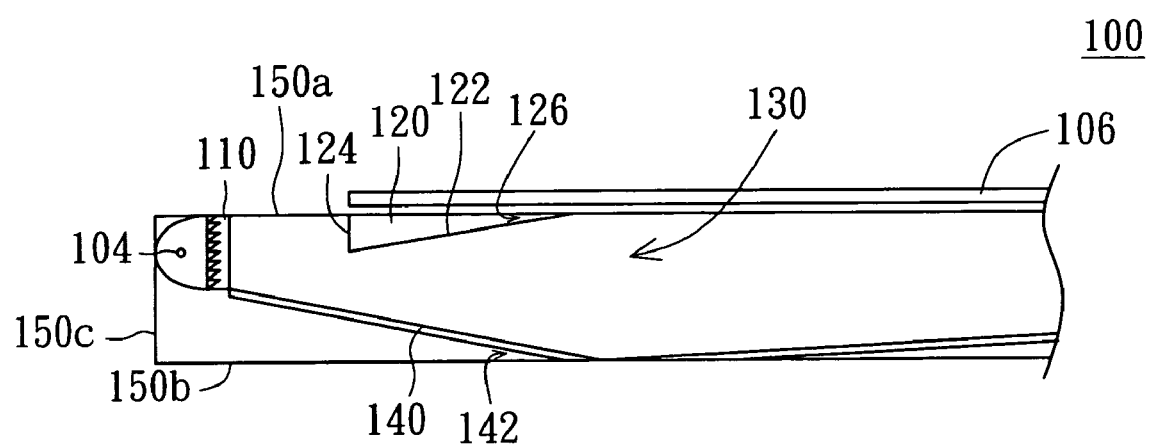
FIG. 2A is a side view showing a portion of the backlight module according to the preferred embodiment of the invention.

Please referring to both FIG. 1 and FIG. 2A, FIG. 2A is a side view showing a portion of the backlight module according to the preferred embodiment of the invention. The diffuser 106 is preferably disposed above the bezel 150. The reflector 140 is disposed under the diffuser 106. The reflector 140 preferably extends to the bottom plane 150b from a bottom of the side light source 104. And there is preferably an elevation angle 142 between the reflector 140 and the bottom plane 150b. The side light source 104 is disposed on a side between the diffuser 106 and the reflector 140. For example, the side light source 104 is disposed on the side plane 150c of the bezel 150. The prism lens 110 is disposed between the side light source 104 and the reflector 140. The TIR lens 120 is disposed on a bottom of the diffuser 106 and adjacent to the side light source 104. The TIR lens 120 preferably has a reflection surface 122 and a vertical surface 124. An acute angle 126 is formed by the reflection surface 122 and the diffuser 106. The vertical surface 124 is perpendicular to the diffuser 106. A distance between the vertical surface 124 and the side light source 104 is less than a distance between the reflection surface 122 and the side light source 104. Furthermore, an air layer 130 is formed within the diffuser 106, the bottom plane 150b and the side plane 150c.

Figure 2B:
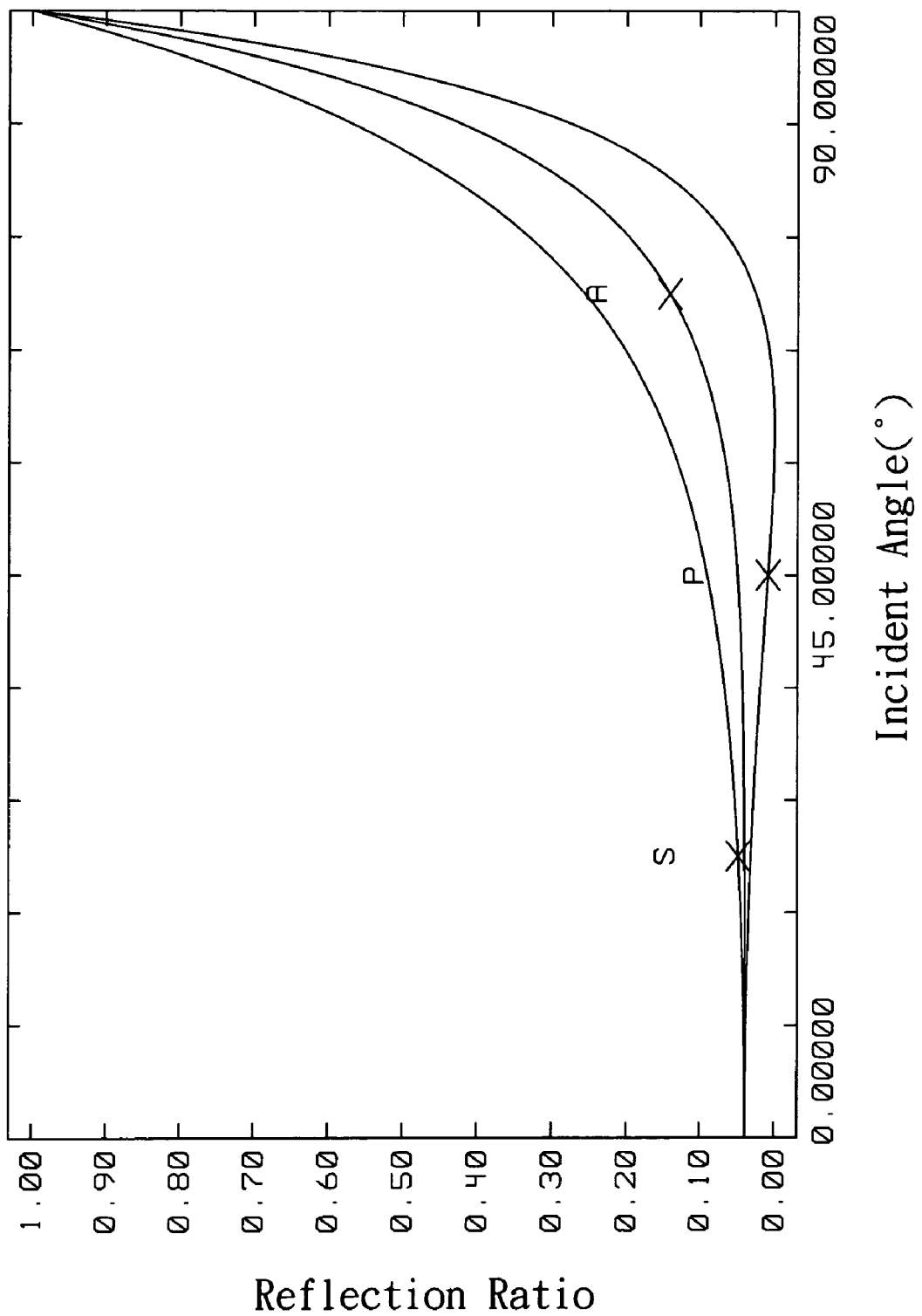
FIG. 2B shows the relation between the incident angle of the diffuser and the reflection ratio.

The diffuser 106 is made of plastic material. When the light is incident to the diffuser 106 from the air layer 130, the relation between the reflection ratio and the incident angle is illustrated as FIG. 2B. Please referring to FIG. 2B, it shows the relation between the incident angle of the diffuser 106 and the reflection ratio. In FIG. 2B, the X-coordinate represents the incident angle of the light, and the Y-coordinate represents the reflection ratio. When the incident angle is less than 80°, the reflection ratio of the diffuser 106 is low. In other words, when the light with an incident angle less than 80° is incident to the diffuser 106 from the air layer 130, most of the light refracts into the diffuser 106 and then emits from the diffuser 106, unable to reflect back to the air layer 130. When the incident angle is greater than 80°, the reflection ratio of the diffuser 106 increases apparently. In other words, when the light with an incident angle greater than 80° is incident to the diffuser 106 from the air layer 130, most of the light reflects back to the air layer 130, unable to pass through the diffuser 106. The backlight module of the preferred embodiment of the invention utilizes this property to increase the light mixing effects of the air layer 130. The incident angle of the light incident to the plastic diffuser 106 is increased, enabling most of the light to reflect back to the air layer 130 to more effectively mix the light. Please referring to FIG. 2A, more concretely speaking, the backlight module 100 of the preferred embodiment of the invention utilizes the plastic diffuser 106 along with the prism lens 110, the reflector 140 and the TIR lens 120 to mix the light sufficiently.

Figure 2C:
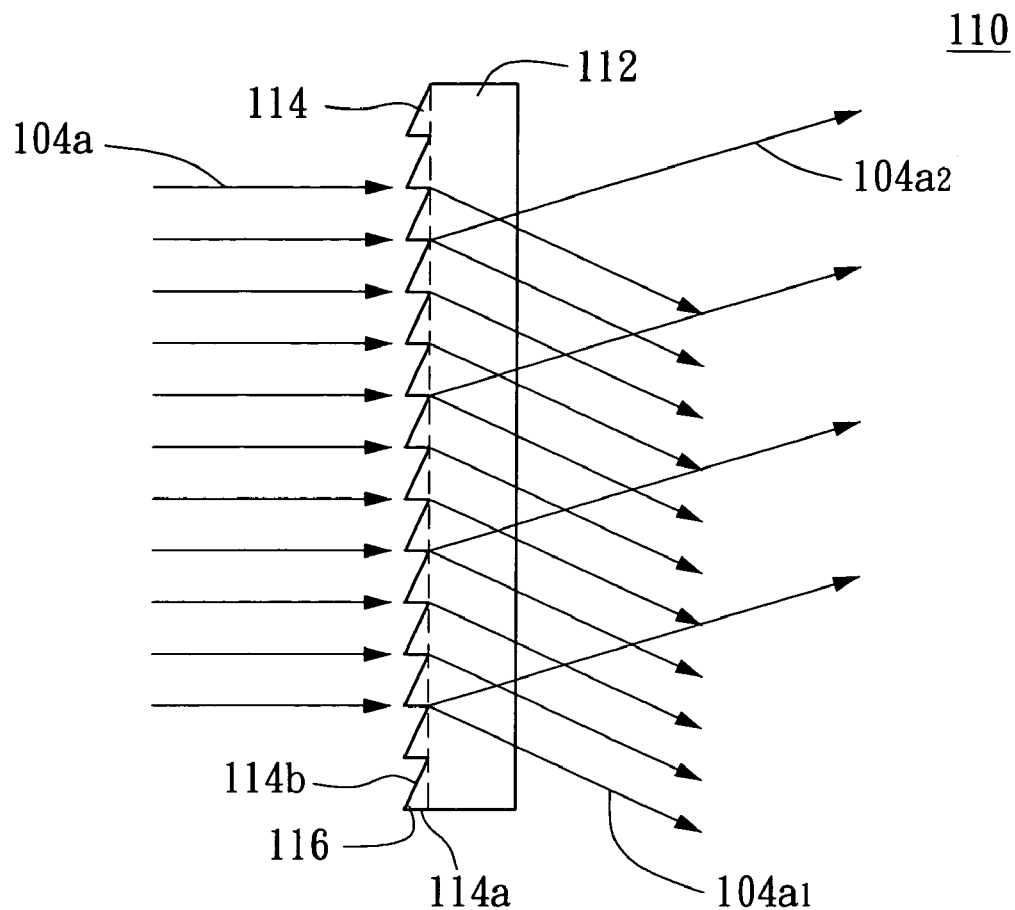
FIG. 2C illustrates the light from the side light source passing through the prism lens.
Figure 2D:
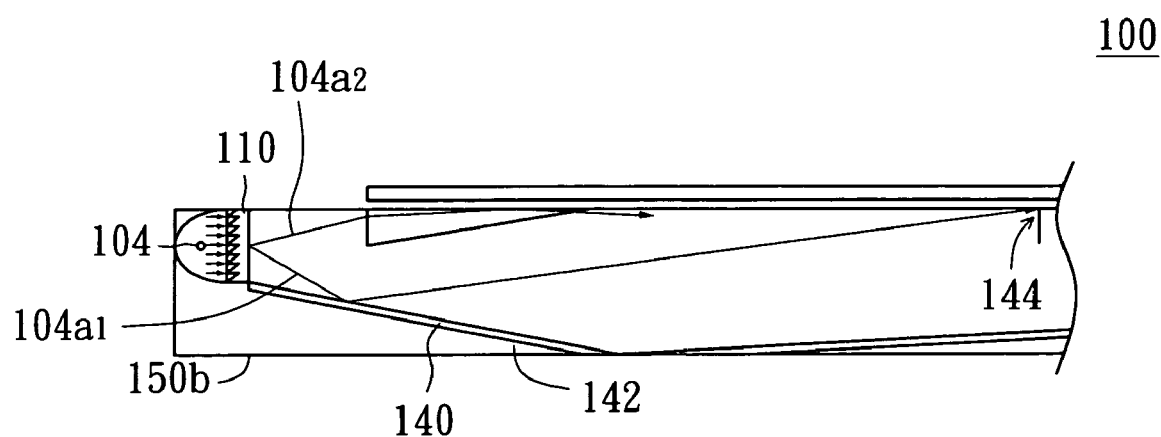
FIG. 2D is a side view showing a portion of the backlight module and the light of the side light source.

For further illustrating the structure and properties of the prism lens 110, please refer to FIG. 2A, FIG. 2B, FIG. 2C and FIG. 2D at the same time. FIG. 2C illustrates the light from the side light source 104 passing through the prism lens 110. FIG. 2D is a side view showing a portion of the backlight module 100 and the light of the side light source 104. The prism lens 110 includes a main body 112 and several protruding parts 114. The protruding parts 114 are formed on the main body 112. Each protruding part 114 has the first plane 114a and the second plane 114b. The first plane 114a is substantially parallel to the diffuser 106. The second plate 114b is above the first plane 114a. And there is an acute angle 116 between the first plane 114a and the second plate 114b. The protruding parts 114 of the prism lens 110 adopted by the backlight module of the preferred embodiment of the invention face the side light source 104, approximately separating the light passing through the prism lens 110 into light $104a_1$ and light $104a_2$. Most of the light passing through the prism lens 110 travels toward the direction of the light $104a_1$. The light $104a_1$ has a downward refracting angle and travels toward the reflector 140, avoiding the light $104a_1$ directly emitting from the diffuser 106 above the bezel 150. Therefore, the light is mixed sufficiently. The light $104a_2$ refracts upwards, traveling toward the diffuser 106.

After the light $104a_1$ passes through the prism lens 110 and refracts to the reflector 140, the light $104a_1$ is reflected by the reflector 140. Then, the reflected light $104a_1$ travels along a direction nearly parallel to the bottom plane 150b due to the elevation angle 142 between the reflector 140 and the bottom plane 150b. Therefore, an incident angle 144 of the light $104a_1$ is increased to approximately greater than 80°, avoiding the light $104a_1$ emitting from the backlight module 100 directly. The value of the elevation angle 142 is determined according to the distance between the side light source 104 and the prism lens 110. The elevation angle 142 is preferably about 20°. Therefore, the prism lens 110 and the reflector 140 together mix the light more completely. Furthermore, the adopted reflector is preferred a mirror reflector or a matte finish reflector.

The TIR lens 120 can be a plastic plate, preferably made of polymethyl methacrylate (PMMA). When the light $104a_2$ is upwards incident to the TIR lens 120 from the air layer 130 in front of the vertical surface 124, the refraction angle of the light $104a_2$ is less than the incident angle of the light because the refraction index of the TIR lens 120 is greater than the refraction index of the air layer 130. Thus, the light $104a_2$ tends to travel along the direction parallel to the diffuser 106, increasing the incident angle of the light $104a_2$ when emitting from the TIR lens 120. When the light $104a_2$ emits from the TIR lens 120, the incident angle of a portion of the light $104a_2$ is greater than the critical angle (total internal reflection angle), and the total internal reflection occurs in the TIR lens 120. Hence, this portion of light $104a_2$ is unable to pass through the diffuser 106. Moreover, an acute angle 126 is formed by the reflection surface 122 and the diffuser 106. The design of the angle 126 increases the incident angle of light incident to the reflection surface 122, increasing the reflection quantity of the light. Because the TIR lens 120 is disposed in front of the side light source 104, the light can be avoided to emit concentrically from the front of the side light source 104, preventing light zones and the dark zones of the backlight module and further increasing the luminance uniformity of the backlight module.

The backlight module described in the embodiment of the invention utilizes the property that the reflection ratio is high when the incident angle is greater than 80°, along with the reflector, the prism lens and the TIR lens to increase the incident angle of the light incident to the diffuser. The backlight module prevents the light from emitting from the diffuser directly. Therefore, most of the light is reflected by the diffuser and is able to return to the air layer again, to mix the light sufficiently. Because the backlight module of the embodiment of the invention abandons the conventional light guide and utilizes the air layer to mix the light, the weight of the backlight module is reduced. The problems resulted from the poor luminance efficiency caused by the light absorption of the light guide is solved. Furthermore, the adopted mirror reflector effectively solves the problems of light absorption of the conventional white reflection print. And the light zones can be avoided due to the TIR lens.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight module, comprising:
   a diffuser;
   a reflector disposed under the diffuser;
   a side light source with a bottom for emitting light disposed on a side between the diffuser and the reflector, wherein the reflector extends to a bottom plane of the module from the bottom of the side light source and there is an elevation angle between the reflector and the bottom plane so that the light emitted from the side light source reflected by the reflector travels along a direction nearly parallel to the elevation angle;
   a prism lens disposed between the side light source and the reflector; wherein the prism lens further comprises:
   a main body; and
   a plurality of protruding parts formed on the main body and facing the side light source, wherein each of the protruding parts has a first plane substantially parallel to the diffuser and a second plane above the first plane, wherein an acute angle is formed between the first plane and the second plane so that the light passing through the prism lens is separated into downward light and upward light; and
   an air layer surrounded by the diffuser, the reflector and the prism lens, wherein while an incident angle of the light is increased to a predetermined degree, the light is reflected back to the air layer and is therefore sufficiently mixed.

2. The backlight module according to claim 1, further comprising a bezel including a bottom plane and a side plane, wherein the diffuser is disposed above the bezel, the reflector is disposed on the bottom plane, and the side light source is disposed on the side plane.

3. The backlight module according to claim 1, wherein the reflector is a mirror reflector or a matte finish reflector.

4. The backlight module according to claim 1, further comprising a total internal reflection (TIR) lens, disposed on a bottom of the diffuser and adjacent to the side light source.

5. The backlight module according to claim 4, wherein the total internal reflection (TIR) lens has a reflection surface and a vertical surface, an acute angle is formed by the reflection surface and the diffuser, the vertical surface is perpendicular to the diffuser, and a distance between the vertical surface and the side light source is less than a distance between the reflection surface and the side light source.

6. A backlight module with a bottom plane, comprising:
   a diffuser;
   a reflector, disposed under the diffuser;
   a side light source with a bottom for emitting light, disposed on a side between the diffuser and the reflector; wherein the reflector extends to a bottom plane of the backlight module from the bottom of the side light source and there is an elevation angle between the reflector and the bottom plane so that the light emitted from the side light source reflected by the reflector travels along a direction nearly parallel to the elevation angle;
   a total internal reflection (TIR) lens disposed on a bottom of the diffuser and adjacent to the side light source, wherein the TIR lens has a reflection surface and a vertical surface, an angle is between the reflection surface and the diffuser, the vertical surface is perpendicular to the diffuser, and a distance between the vertical surface and the side light source is less than a distance between the reflection surface and the side light source so that a portion of the light is totally internal reflected and another portion of the light is emitted out of the TIR lens; and
   an air layer surrounded by the diffuser, the reflector and the TIR lens, wherein while an incident angle of the light is increased to a predetermined degree, the light is reflected back to the air layer and is therefore sufficiently mixed.

7. The backlight module according to claim 6, further comprising a bezel, wherein the diffuser is disposed above the bezel, the reflector is disposed on a bottom plane of the bezel, and the side light source is disposed on a side plane of the bezel.

8. The backlight module according to claim 6, further comprising a prism lens, disposed between the side light source and the reflector.

9. The backlight module according to claim 8, wherein the prism lens comprises:
   a main body; and
   a plurality of protruding parts, formed on the main body and facing the side light source, wherein each of the protruding parts has a first plane substantially parallel to the diffuser and a second plane above the first plane, wherein an acute angle is formed between the first plane and the second plane.

10. The backlight module according to claim 6, wherein the reflector is a mirror reflector or a matte finish reflector.

* * * * *